US007584007B2

(12) United States Patent
Eul

(10) Patent No.: US 7,584,007 B2
(45) Date of Patent: Sep. 1, 2009

(54) ROAD PAVER AND DATA MEMORY DEVICE

(75) Inventor: Achim Eul, Mannheim (DE)

(73) Assignee: Joseph Voegele AG, Mannheim (DE)

(*) Notice: Subject to any disclaimer, the term of this patent is extended or adjusted under 35 U.S.C. 154(b) by 238 days.

(21) Appl. No.: 11/464,442

(22) Filed: Aug. 14, 2006

(65) Prior Publication Data

US 2007/0088858 A1 Apr. 19, 2007

(30) Foreign Application Priority Data

Aug. 17, 2005 (EP) ................................. 05017912

(51) Int. Cl.
*G05B 15/00* (2006.01)
*E01C 19/00* (2006.01)

(52) U.S. Cl. ......................... 700/83; 404/84.1; 711/162

(58) Field of Classification Search ................... 404/95, 404/96, 101–104, 83, 84.1; 439/296, 314, 439/320; 700/17, 83; 717/174; 710/10; 711/161, 162

See application file for complete search history.

(56) References Cited

U.S. PATENT DOCUMENTS 5,327,345 A * 7/1994 Nielsen et al. ................ 701/50
5,908,459 A 6/1999 Rower et al.
5,983,165 A * 11/1999 Minnich et al. ............. 404/117
2001/0036762 A1* 11/2001 Payson et al. ............... 439/320
2005/0064757 A1 3/2005 Kathan et al.
2007/0044088 A1* 2/2007 Eul ............................ 717/174

FOREIGN PATENT DOCUMENTS

| | | |
|---|---|---|
| DK | 10138120 | 2/2003 |
| DK | 102004005266 | 4/2005 |
| EP | 0790353 | 8/1997 |
| WO | WO-03/015222 | 2/2003 |

OTHER PUBLICATIONS

Janitzki: "Professionelle Bodenverdichtung mit himmlischer Unterstutzung" TIEFBAU, Oct. 2004, Seiten 650-653, XP009060193 Dachu *Seite 651, Spalte 1—Spalte 3*.

* cited by examiner

*Primary Examiner*—Charles R Kasenge
(74) *Attorney, Agent, or Firm*—Darby & Darby P.C.

(57) ABSTRACT

An electronic control device on a road paver includes an operator's console and a host system unit which is connected via a bus system to electronic subsystems, and which has an inputting and indicating section and a storage area for adjusted machine parameter-data, which machine parameter-data are set and stored at least in the host system unit for the parameterization of the road paver, whereby at least one data exchange port is provided which is connected to the host system unit and which is bi-directional. A mobile data memory device is detachably attached to the data exchange port for storing and safeguarding at least the machine parameter-data, which are set in the host system unit in redundant fashion.

3 Claims, 1 Drawing Sheet

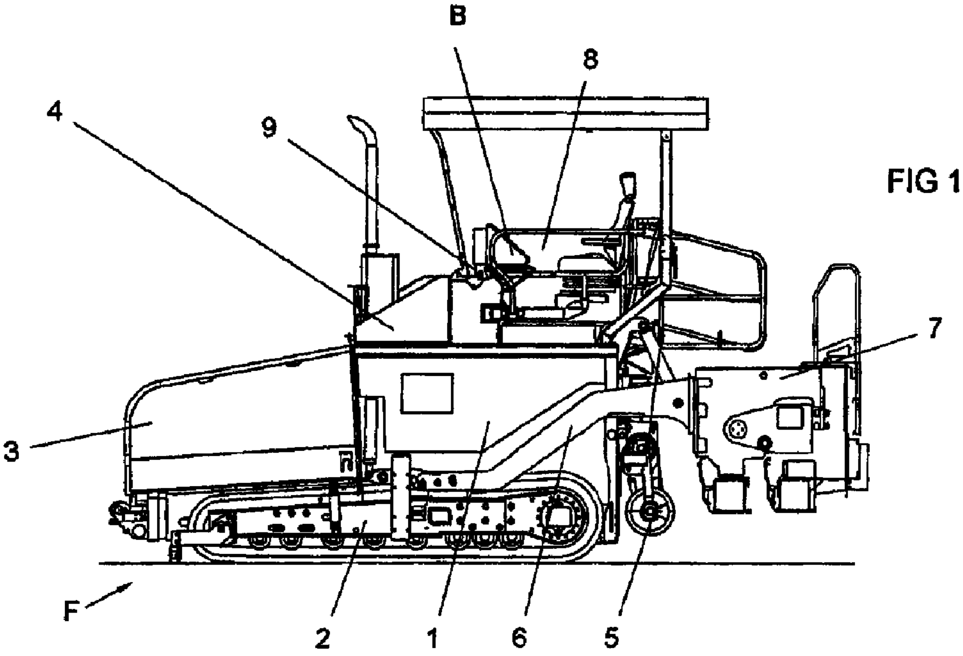
FIG 1
FIG2
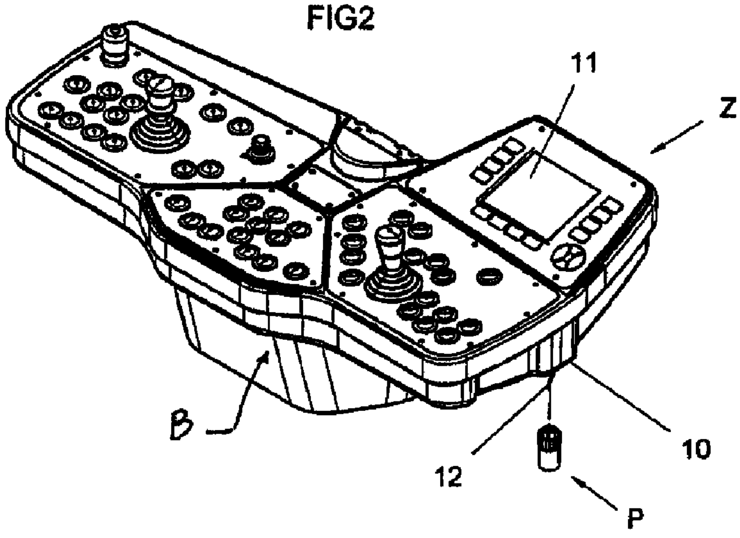
FIG3
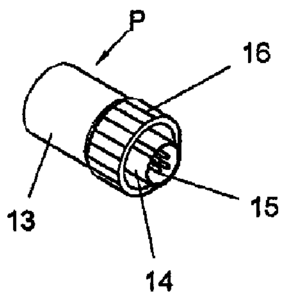
FIG4
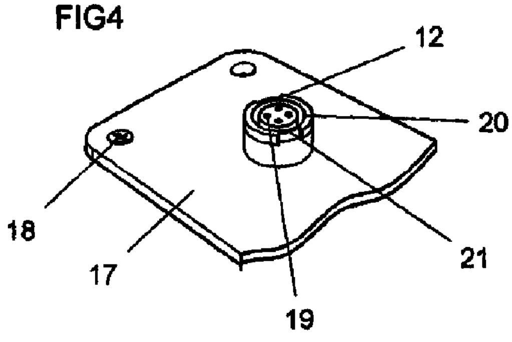
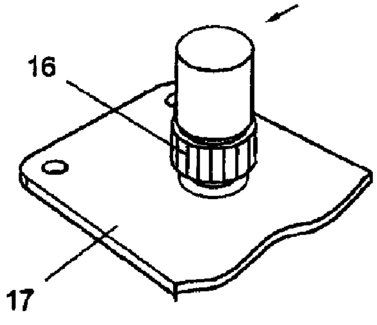
FIG5

ROAD PAVER AND DATA MEMORY DEVICE

TECHNICAL FIELD

The invention relates to a road paver of the type that includes an electronic control system which includes an operator's console and a host system unit which is connected via a bus system with electronic subsystems and which has an inputting and indicating section and a memory area for machine parameter-data.

BACKGROUND

The electronic equipment of the caterpillar track road paver "SUPER 1800-1", of the company Joseph Vögele AG, as known from practice and as known from a leaflet distributed during the BAUMA 2004 exhibition, includes an onboard host system unit in the operator's console, as well as several central or peripheral memory programmable controls and controller units, several central or peripheral input/output modules, exterior operator stands, engine electronics, generator electronics and several subsystems with sensors and actuators, which are all directly or indirectly incorporated into a field bus. For the operation of the road paver, different machine parameters are adjusted by means of input data, which, at least to a large extent, is stored in the host system unit, constituting a central data memory. In the case of a breakdown of the host system unit, the adjusted machine parameters will be lost, meaning, that after repairing or replacing the host system unit, a re-parameterization has to be carried out. When single subsystems or the host system unit and the like fail and have to be replaced during a service procedure, conventionally the machine parameter-data are stored in several subsystems within the control system, in a redundant manner, such that, after replacing a component, the machine parameter-data should nonetheless remain in the system. Redundant data-storing requires a costly and high capacity design of the subsystems or components used for this task, and inexpediently requires distributed, high memory capacities. However, the possibility of data being lost by some active components, remains.

Examples of such machine parameters are: Target speeds, speeds for pressing-bars and/or tamper-bars and hydraulic supply quantities, adjustments to the quantity of road building material to be supplied and distributed, target temperatures for heated working components, attack angles of the paving screed, working widths of the paving screed, adjustments to the aggregates used for casting tracks, the quantity of the material which has to be laid on the ground in front of the lateral distribution mechanism and/or in front of the paving screed, the thickness of the cast track, target adjustments for hydraulic pumps and/or hydraulic motors, target adjustments of an automatic screed leveling system, if provided, and the like.

In the road paver known from EP 0 790 353 A, processing units communicate via a common bus system and the host system unit, including a bus driver, with an operator's console, constituting the interface between man and road paver. Target values or data for controlling and for casting tracks, may be input via an interface of the host system unit from the exterior by a floppy disk or by means of data remote transmission. Furthermore, data on machine conditions, as administrated by the host system unit, may be transmitted upon demand via a service interface to a floppy disk or to a paper printer or to a separate computer.

A ground compacting apparatus, the control of which is supported by a GPS-system, is known from an article in the Tiefbau 10/2004 Journal, titled: "Professionelle Bodenverdichtung mit himmlischer Unterstützung", authors: Janitzki, Boppard. Project data are installed in a conventional computer and are then transmitted by means of a USB-stick to a monitor in the cabin of the compaction apparatus. Data, as recorded and processed during operation, is retransmitted via the USB-stick to the computer for evaluation purposes and processing purposes. Since a conventional USB-stick cannot withstand the coarse working conditions in a compaction apparatus, the USB-stick is only plugged-in upon demand.

A flange housing for a plug, as known from DE 10 138 120 A, is used for handling numerically controlled machines or memory programmable control systems. The plug is part of a USB-interface at which a conventional USB-stick can be plugged-in in order to carry out the data transfer upon demand. The USB-interface is protected against environmental influences.

A connector having a pull-release is known from DE 10 2004 005 266 A. Network connections between industrially used machines are made via cables with the help of the connector, such that accidental pulling of, or increased vibration loads at, the connection cable, cannot release the plug from the plug-in connection. The plug is a conventional network plug or a conventional USB-stick.

A connector body, as known from US 2001/0036762 A, is connected to a connection cable and contains, in a receptacle, an inline connector which is accommodated in the molded body. A coupling nut allows the connection of the connector body to an exterior thread of a plug-in connection. A permanent connection is established from the connector body to the connecting cable.

SUMMARY

It is an object of the invention to provide a road paver of the type as mentioned at the beginning, in which a re-parameterizing can be avoided in the case of a service process, which service process might be critical for an already present parameterizing.

The machine parameters, as installed in the host system unit, are stored in the form of data in the data memory device, and are, as such, permanently available. In the case of a failure of, e.g., the host system unit, all previously installed and stored machine parameters are saved in the data memory device and can immediately be re-used again, once the operator's console or other control components have been replaced. The data memory device may remain at the road paver during the service process, such that the host system unit may re-retrieve the data without time consuming re-parameterizing steps. Should the component of the control system, to which the data memory device is removably attached, also have to be replaced, then the data memory device is removed and is subsequently re-attached. The data memory device, so to speak, constitutes a peripheral passive preserving location for the machine parameter-data, may be regularly updated, and relieves the host system unit and subsystems connected to the host system unit. The data memory device and/or the data exchange port, may be safeguarded in conventional fashion, in order to avoid that data will be lost in case of a breakdown or that an error leading to the breakdown will be transmitted into the data memory device. The data memory device is passive and, for this reason, better for saving the data than components or subsystems which are active in the road paver and which may be damaged during the operation due to their activities. In view to ease of handling, the data exchange port is a plug-in connection. The data memory device has the plug which fits into the plug-in connection, such that the plug can be removed.

Replacement of the data memory device can thus be carried out comfortably, requiring few steps. As the working conditions on a road paver are, by nature, relatively coarse, the data memory device has a robust and compact, preferably substantially cylindrical, outer housing, accommodating at least one micro storage unit, preferably with an internal storage logic. The data memory device is a compact and inexpensive accessory part of the road paver and is capable of withstanding marked mechanical loads.

Expediently, the data exchange port is stationarily placed in the vicinity of the host system unit, in order to assure short transmission paths. The data exchange port is provided in or at the operator's console, preferably in a side wall or in the rear wall. In this case, as is conventional, the host system unit may be accommodated inside the operator's console. If the operator's console has to be replaced during a service process, the data memory device only needs to be removed and to be re-attached to the new operator's console, in order to assure that the parameterization which is at hand in the data memory device will again be available.

In an alternative embodiment, the data exchange port may be provided at or within an electronic box, which, conventionally, is arranged at the operator's stand.

Particularly expediently, the data exchange port is provided at a detachable housing lid which can be disassembled and can be removed during a service process, and can again be assembled to the replaced unit.

In order to prevent an accidental undesired or unauthorized removal of the data memory device, it is expedient to provide at least one safeguarding element for the plug-in connection at the data exchange port and/or at the data memory device. This safeguarding element comprises, e.g., a closure such as a threaded closure, a bayonet closure, a ratchet closure or a snap-bracket closure, which, on one hand, is safe and on the other hand, can be handled easily. In some cases, the closure may even be lockable in order to prevent an unauthorized removal of the data memory device during work breaks. Furthermore, the closure also protects the galvanic connection against dirt, influences of the weather, and against aggressive agents.

In a preferred embodiment, a gland nut is rotatably secured at the outer housing of the data memory device, said gland nut surrounding the plug and having an internal thread or an internal bayonet element. The plug-in connection of the data exchange port is surrounded by a protective collar, which has a counter-thread or a counter-bayonet element. In some cases, the data memory device may even be safeguarded by means of a chain or the like, at the operator's stand of the road paver, such that it cannot get lost or be stolen from the road paver.

In each case, the data memory device should be suitably designed to withstand the rough conditions occurring on a construction machine and, e.g., should be shielded against the loss of data or disturbances during a transmission of data.

BRIEF DESCRIPTION OF THE DRAWINGS FIGURES

An embodiment of the invention will be explained with the help of the drawing. The drawing displays:

FIG. 1 a schematic side view of a road paver,

FIG. 2 details of the operator's stand of the road paver in FIG. 1,

FIG. 3 a perspective view of a mobile data memory device,

FIG. 4 a perspective view of a data exchange port for attaching the data memory device, and FIG. 5 the data memory device attached to the data exchange port.

DETAILED DESCRIPTION OF EXEMPLARY EMBODIMENTS

A road paver F, as schematically shown in FIG. 1, travels by its chassis 1 on an undercarriage 2 and has a front side material hopper 3 behind which a primary driving source 4 is arranged. At the rear end of the chassis 1, a lateral distribution device 5 is provided, e.g. an auger mechanism, behind which a paving screed is located which is connected by outriggers 6 to the chassis 1. In an upper region, behind the primary source 4, an operator's stand 8, where an operator's console B is located, is provided, which, e.g. accommodates a host system unit Z of an electronic control device of the road paver F. A transmission path 9 extends from the operator's console B to electrical subsystems of the road paver F. The electronic control device contains a bus system, e.g. a field bus, to which several central or peripheral memory programmable controls units and controller units, several central or peripheral I/O modules, external control stands, an engine electronics, a generator electronics and several subsystems with sensors and actuators, are connected. These components of the control system are used for control functions, regulating functions and monitoring functions when operating the road paver. Machine parameters, in the form of data, are inputted and stored at least in a storage area of the host system unit Z. During the operation of the road paver, the electronic control device permanently accesses the machine parameters. The machine parameters may be changed during operation, for reorganizing purposes, at the host system unit Z or at an inputting and indicating section 11 of the operator's console B. In this case, the machine parameters are not only simple base data which can be used for different types of road pavers, but also comprise data which can be used specifically only for this road paver and/or for the task of casting tracks with this road paver, respectively.

FIG. 2 is a perspective view of the operator's console B at the operator's stand 8 of the road paver F of FIG. 1. The operator's console serves to visualize the processes and has, besides actuating elements, the inputting and indicating section 11, including at least one display or a touch screen, or the like. The transmission path 9 extends within a guideway from the operator's console B to the already mentioned subsystems or to a not shown electronic box, which is provided at a suitable location, in most cases in the area of the operator's stand. The host system unit Z and its storage area, e.g., are integrated into the operator's console B. A data exchange port 12 is provided at the operator's console B, e.g. in a rear wall or a lower side (or in a side wall 10). A data memory device P is detachably attached to the exchange port 12. The data memory device P contains at least one micro storage unit and, preferably, a storage logic. The data memory device P may be anchored (not shown), e.g. by means of a chain or suchlike, to the operator's stand, such that it is thief-proof.

The data memory device P is built such that it can withstand rough conditions on a construction machine and is connected via the data exchange port 12 to the host system unit Z in order to store or to transmit the machine parameters, in the form of data, to the host system unit. In the case of a replacement of the host system unit Z, during a service process, the machine parameters adjusted beforehand will then immediately be re-available. In case of a replacement of the operator's console B, the data memory device P will be removed and re-attached to the new operator's console B in order to immediately transmit the data of the machine parameters to the host system unit Z. The transmission may either be carried out automatically, e.g. during a start of the system, or can be commanded via the inputting and indicating section 11. The data memory device P is expediently delivered as an accessory part of the road paver F, together with the road paver F, to the purchaser.

The data memory device P, in FIG. 3, has a robust outer housing 13, which is built such that it can withstand the rough conditions on the road paver F. The outer housing, e.g. is substantially cylindrical and contains at least one micro storage unit and, in some cases, the storage logic. The outer housing 13 may consist of plastic material and, expediently, is reinforced and/or shielded, in some cases. At one end of the outer housing 13 a plug 14 is provided, which contains connection contacts 15. Furthermore expediently, a gland nut 16 is rotatably provided at the outer housing 13, which serves to safeguard and protect the plug-in connection after attaching the data memory device P to the data exchange port 12. The gland nut 16 constitutes a safeguarding element and, in some cases, may even be lockable.

A covering plate 17 is secured by fastening elements 18 in FIG. 4, e.g. in the rear wall or the lower wall of the operator's console B. The data exchange port 12 is provided in the covering plate 17 and is formed as a plug-in connection containing wrap connections or contacts 19. A protecting collar 20 is provided for protecting the wrap connections and the plug-in connection. The protecting collar 20 surrounds the plug-in port and has an outer thread 21 for the gland nut 16. In some cases, instead of a threaded connection, a bayonet closure, a detent closure, or a snap-bracket closure is used for securing the data memory device P and for protection purposes, and, in some cases, for fluid-tight sealing of the plug-in connection.

FIG. 5 illustrates the correctly attached data memory device P, which is secured by means of the gland nut 16 to the covering plate 17.

In an alternative embodiment, the data exchange port 12 of the data memory device P could be placed at another suitable location in the operator's stand 8 of the road paver F, e.g. close to the host system unit C, and, in some cases, at or in the electronic box of the electronic control device. As the machine parameter-data are stored and safeguarded in a redundant fashion in the passive data memory device P, the need for a re-parameterization of the electronic control device is eliminated in the case of a service process, e.g. after replacing the host system unit Z and/or the operator's console B, as the needed data, which has been obtained and stored earlier, is permanently available from the data memory device P. For updating the machine parameter-data, the data memory device P is transported to another location, e.g. a service location, in order to avoid an updating procedure in the construction machine.

The invention claimed is:

1. A road paver comprising:

an electronic control system which includes an operator's console at an operator's stand and a host system unit which is connected via a bus system with electronic subsystems and which has an inputting and indicating section and a memory area for machine parameter-data, the machine parameter data being installed and stored in the form of data in the memory area of the host system unit for parameterization of the road paver, a bi-directional data exchange port at the operator's stand which is connected with the host system unit, a passive data memory device, which remains at the road paver and is permanently plugged-in at the data exchange port, configured to save and externally store in redundant fashion the same machine parameter-data as already internally stored in the host system unit for retrieval by the host system unit after a service, a failure, or replacement, or a breakdown of at least the host system unit; and wherein the passive data memory device has an outer housing made of plastics materials and having at least one of a reinforcement against mechanical loads and a shielding against data losses, the housing containing at least one parameter data micro storage unit for parameter data and a first fastening mechanism that mates with a second fastening mechanism that is associated with the data exchange port to securely couple the two fastening mechanisms together.

2. The road paver according to claim 1, wherein the outer housing accommodates, besides the at least one parameter data micro storage unit, an internal storage logic.

3. The road paver according to claim 1, wherein the outer housing has a substantially cylindrical shape, a gland nut rotatably held at the outer housing, the gland nut surrounding a plug of the data memory device and having one of an internal thread and an internal bayonet element, and wherein the plug-in connection of the data exchange port is surrounded by a protecting collar having one of a counter-thread and a counter-bayonet element.

* * * * *